(12) United States Patent
Chee

(10) Patent No.: US 7,238,932 B2
(45) Date of Patent: *Jul. 3, 2007

(54) OPTICAL POSITION SENSING DEVICE

(75) Inventor: Chong-Hin Chee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 11/436,337

(22) Filed: May 17, 2006

(65) Prior Publication Data

US 2007/0007446 A1    Jan. 11, 2007

Related U.S. Application Data

(63) Continuation of application No. 10/424,271, filed on Apr. 28, 2003, now Pat. No. 7,057,163.

(30) Foreign Application Priority Data

Jun. 25, 2002   (MY) .............................. PI20022390

(51) Int. Cl.
*G01D 5/34* (2006.01)
(52) U.S. Cl. ............................ 250/231.16; 250/231.13; 356/616
(58) Field of Classification Search ..............................
250/231.13–231.18, 566, 568–570, 237 R, 250/237 G; 356/616–619
See application file for complete search history.

(56) References Cited

U.S. PATENT DOCUMENTS

| 3,297,879 | A | * | 1/1967 | Meyer ..................... 250/237 R |
| 4,409,479 | A | * | 10/1983 | Sprague et al. ......... 250/237 G |
| 4,893,071 | A | * | 1/1990 | Miller ........................ 324/660 |
| 5,304,937 | A | * | 4/1994 | Meyer ........................ 324/686 |
| 6,791,699 | B2 | * | 9/2004 | Aoki .......................... 356/616 |

* cited by examiner

*Primary Examiner*—Thanh X. Luu
*Assistant Examiner*—Stephen Yam

(57) ABSTRACT

An optical position sensing device for sensing a two-dimensional displacement, comprising a first photosensor arranged parallel to a first axis; a second photosensor arranged parallel to a second axis; wherein the first and the second axis are at an angle with respect to each other; and an encoding means which interferes with a path of light incident on the photosensors such that a pattern consisting of light and shadow is cast onto the photosensors, wherein the encoding means and the photosensors are able to move with respect to each other, resulting in modulation of light received by the photosensors, and are arranged in an arrangement such that when the encoding means moves relatively in a direction parallel to the first axis, the modulation of light received by the second photosensor is larger than the modulation of light received by the first photosensor; and when the encoding means moves relatively in a direction parallel to the second axis, the modulation of light received by the first photosensor is larger than the modulation of light received by the second photosensor.

20 Claims, 6 Drawing Sheets

OPTICAL POSITION SENSING DEVICE

CROSS-REFERENCE TO RELATED APPLICATION

This is a continuation of application Ser. No. 10/424,271, filed on Apr. 28, 2003 now U.S. Pat. No. 7,057,163, the contents of which are incorporated in their entirety.

BACKGROUND OF THE INVENTION

The present invention relates to an optical position sensing device which allows a displacement along a two-dimensional plane to be determined.

The encoder enables a signal interpretation such as to obtain information on a position, velocity, an acceleration and/or the like when the encoder works in pair with a codewheel or a codestrip. The codewheel/codestrip comprises a regular pattern of slots and bars. According to the position of the slots and bars, the codewheel/codestrip permits or prevents light from passing through. The optical detector detects the light that is transmitted by the codewheel/codestrip and provides an unambiguous information on the motion of the codewheel/codestrip based on the detected light signal.

FIG. 1A shows a cross-section of a typical optical encoder 100. The encoder 100 comprises of a housing 104, an optical emitter 101, an optical detector 102 and an optical lens 106.

A free area 107 is provided in the housing between the optical emitter 101 and the optical detector 102. A part of a codewheel 103 is accommodated within the free area 107, such that it is able to interfere with the path of the light 105 emitted by the optical emitter 101. The codewheel 103 is able to move freely within the free area 107 and the light 105 from the optical emitter 101 is able to pass through or is prevented from passing through the pattern on codewheel 103. The light 105 that passes through the codewheel 103 is detected by the optical detector 102, which produces a corresponding photocurrent.

FIG. 1B shows a cross-section of a typical reflection, optical encoder 120. The reflection encoder 120 comprises the optical emitter 101, the optical detector 102, a first lens 110 and a second lens 111.

The first lens 110 is provided directly next to the optical emitter 101 for collimating the light emitted by the optical emitter 101 into parallel light beam 112. The parallel light beam 112 is directed towards the codewheel/codestrip 103, and depending on the patterns on the codewheel/codestrip 103, part of the parallel light beam 112 is either absorbed or reflected. The reflected light beam 113 is directed towards the second lens 111 which is provided directly next to the optical detector 102, wherein the second lens 111 focuses the reflected light beam 113 onto the optical detector 102. The optical detector 102 detects the amount of light received and generates a corresponding photocurrent.

The output of the optical detector in both the above encoders, that is the photocurrent, is normally processed in an analog signal processor to generate an analog signal, and the analog signal is subsequently passed to an Analog-to-Digital Converter (ADC) for generating digital outputs, providing information on the magnitude and direction of the displacement of the codewheel, and hence a device the codewheel is coupled to.

ADC circuits are usually very large and a number of discrete output levels are needed to represent the displacement. A discrete range of reference thresholds, depending on the number of output levels required, are therefore needed to be set to discriminate between the output levels. The reference thresholds are to be designed such that they are tolerant to any changes in the photocurrent levels due to changes in the brightness of the light source, in particular the optical emitter. The reference thresholds must also be tolerant to any variations in the fabrication process of the photodetectors, aging of any devices used and any other transient factors like temperature shift.

To overcome the problems mentioned above, an optical rotary pulse generating encoder with quadrature output is commonly used as a digital optical encoder. In an optical rotary pulse generating encoder with quadrature outputs, the optical detector usually comprises multiple sets of photodiodes as photodetectors, and the photocurrents generated by the photodiodes are fed through signal processing circuitries to produce a plurality of pairs of complementary analog signals. These pairs of complementary analog signals are further processed, for example in comparator circuits, to produce digital output signal pairs which are in quadrature. The magnitude and direction of displacement can be extracted from the quadrature output signal pairs, providing the displacement information from an initial position.

The HEDR-8000 series optical encoders manufactured by Hewlett Packard have an arrangement similar to the encoder 120 described in FIG. 1B. The optical detectors used in the optical encoders comprise of four photodetectors which are illuminated by light reflected from a codewheel in an alternating manner. The photocurrents generated by the photodetectors are compared, and a pair-of output signals which is indicative of the position of a shaft is generated.

The output signals produced by either the quadrature output encoder described above or the optical encoders manufactured by Hewlett Packard are only able to provide information on displacement along a single axis, i.e. for single axis applications. For dual-axis applications like detecting the movement of a trackball of a mouse, two separate optical rotary pulse generating encoders are needed in order to provide displacement information of the mouse along two axes, or on a two-dimensional plane. This results in more piece parts and larger operational space of the encoder, hence the product cost is increased. Therefore, an efficient digital optical position sensing device for sensing a two-dimensional displacement is desired.

SUMMARY OF THE INVENTION

According to the invention, an optical position sensing device for sensing a two-dimensional displacement is provided. The optical position sensing device comprises a first photosensor arranged parallel to a first axis, a second photosensor arranged parallel to a second axis, wherein the first and the second axes are at an angle with respect to each other, and an encoding means which interferes with a path of light incident on the photosensors such that a pattern consisting of light and shadow is cast onto the photosensors, wherein the encoding means and the photosensors are able to move with respect to each other, resulting in modulation of light received by the photosensors, and are arranged in an arrangement such that when the encoding means moves relatively in a direction parallel to the first axis, the modulation of light received by the second photosensor is larger than the modulation of light received by the first photosensor, and when the encoding means moves relatively in a direction parallel to the second axis, the modulation of light received by the first photosensor is larger than the modulation of light received by the second photosensor.

Light is emitted onto the photosensors by a light source, for example an optical emitter, and the encoding means is used to interfere with the path of the light from the optical emitter to the photosensors. Depending on the amount of interference of the light path by the encoding means, a corresponding photo-output signal, in particular a photocurrent, proportional to the amount of incident light is generated from each of the photosensors.

DETAILED DESCRIPTION OF THE PREFERRED EMBODIMENT OF THE INVENTION

Figure 1A:
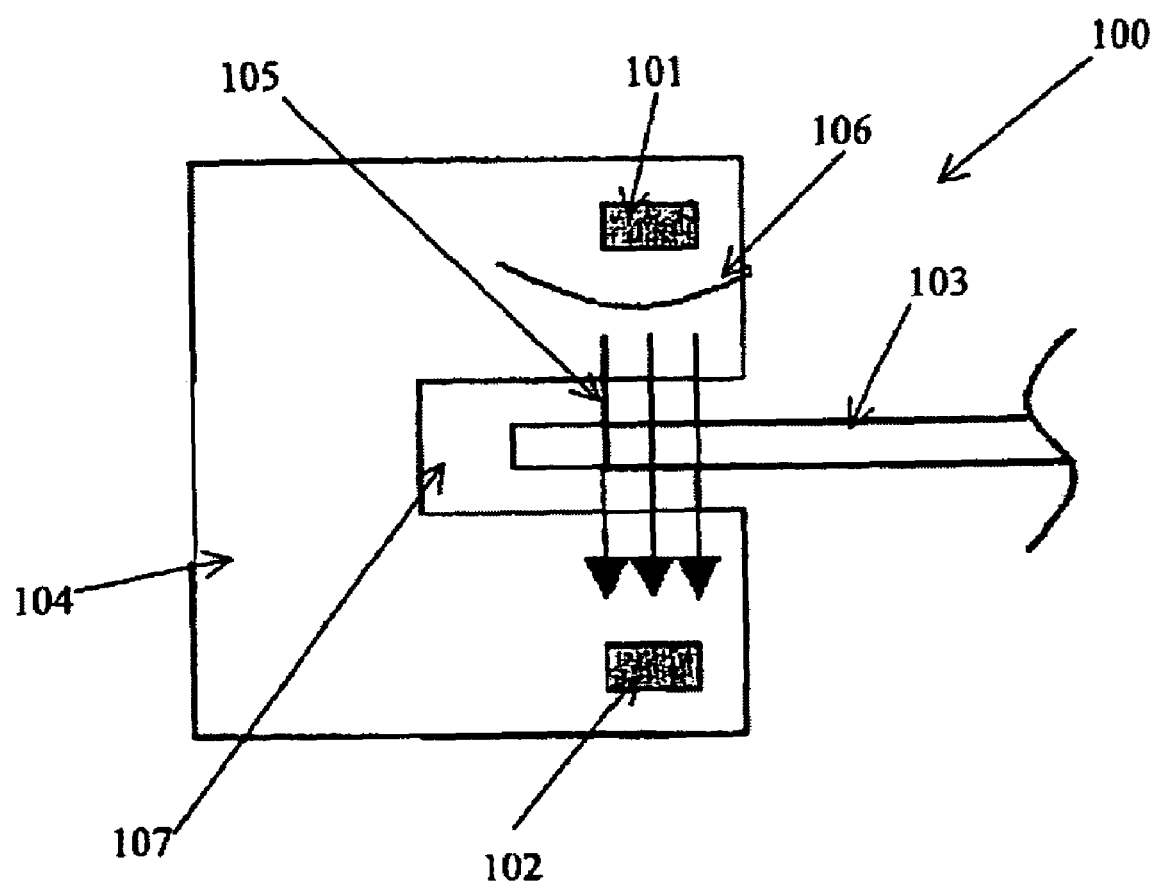
FIG. 1A shows a cross-section of an optical encoder.

Preferred embodiments of the invention will now be described with reference to the accompanying drawings.

According to the invention, an optical position sensing device for sensing a two-dimensional displacement is provided. The optical position sensing device comprises a first photosensor arranged parallel to a first axis, a second photosensor arranged parallel to a second axes, wherein the first and the second axis are at an angle with respect to each other, and an encoding means which interferes with a path of light incident on the photosensors such that a pattern consisting of light and shadow is cast onto the photosensors, wherein the encoding means and the photosensors are able to move with respect to each other, resulting in modulation of light received by the photosensors, and are arranged in an arrangement such that when the encoding means moves relatively in a direction parallel to the first axis, the modulation of light received by the second photosensor is larger than the modulation of light received by the first photosensor, and when the encoding means moves relatively in a direction parallel to the second axis, the modulation of light received by the first photosensor is larger than the modulation of light received by the second photosensor.

Light is emitted onto the photosensors by a light source, for example an optical emitter, and the encoding means is used to interfere with the path of the light from the optical emitter to the photosensors. Depending on the amount of interference of the light path by the encoding means, a corresponding photo-output signal, in particular a photocurrent, proportional to the amount of incident light is generated from each of the photosensors.

The optical position sensor according to the invention is able to detect a two-dimensional displacement by processing the variations of the photocurrents generated by the photosensors parallel to the first and second axes, and obtaining information, for example frequency, relating to the magnitude of the displacement. Such two-dimensional displacement information, in a conventional system, requires two separate encoders.

When the encoding means moves relatively in the direction parallel to the first axis, both the first and second photosensors will receive a modulation of the light received, with the modulation of the light received by the second photosensor being greater than that received by the first photosensor. The photocurrent generated as a result of the larger modulation of light received by the second photosensor is used as the displacement information in the direction parallel to the first axis. It is preferable that the modulation of the light received by the second photosensor be much larger compared to the modulation of the light received by the first photosensor, so that the modulation of the light received by the first photosensor will not be mistaken as a movement along the direction in the second axis.

When the encoding means moves relatively in the direction parallel to the first axis, both the first and second photosensor will receive a modulation of the light received, with the modulation of the light received by the second photosensor greater than that received by the first photosensor. The photocurrent generated as a result of the larger modulation of light received by the second photosensor is used as the displacement information in the direction parallel to the first axis. It is preferable that the modulation of the light received by the second photosensor to be much larger compared to the modulation of the light received by the first photosensor, so that the modulation of the light received by the first photosensor will not be mistaken as a movement along the-direction in the second axis.

Similarly, when the encoding means moves in a direction parallel to the second axis, the modulation of the light received by the first photosensor is preferably much larger than the modulation of the light received by the second photosensor for the same reasons as described above.

According to a preferred embodiment of the invention, the first photosensor comprises four photodetectors, forming a first pair and a second pair of photodetectors, and the second photosensor also comprises four photodetectors, forming a third pair and a fourth pair of photodetecors.

The interference from the encoding means to the light path causes the pattern of light and shadow to be cast on the photodetectors such that in one photodetector pair, the photodetector pair is illuminated in a complementary manner. When the encoding means moves with respect to the photodetectors, one photodetector of the pair will receive an increase in amount of light and the other photodetector of the same pair will receive a corresponding decrease in amount of light in a complementary manner. However, the total amount of light received by the photodetector pair is substantially constant.

The movement of the encoding means, and hence the light and shadow pattern, with respect to the photodetectors causes the light received by the photodetectors to be modulated in a regular manner, and the photodetectors generate photocurrents which correspond to the amount of light received. The photocurrents from the photodetectors of the first photosensor parallel to the first axis are extracted and processed to provide information on a displacement in a direction parallel to the second axis. Similarly, the photocurrents from the photodetectors of the second photosensor parallel to the second axis are extracted and processed to provide information on a displacement in a direction parallel to the first axis. The two-dimensional displacement information in this preferred embodiment of the invention not only provides information on the magnitude of the two-dimensional displacement, but also the direction of the displacement. Therefore, a two-dimensional displacement, including direction of the movement, can be detected.

The optical position sensor according to the preferred embodiment of the invention is able to be used, for example in a conventional computer mouse. In the conventional computer mouse, a trackball is normally used, wherein the trackball is coupled to two separate codewheels to detect the movement of the mouse in the x-y direction. However, according to the invention, the movement along the x-y direction can be detected directly without the use of two separate encoders and codewheels.

According to a further preferred embodiment of the invention, the encoding means comprises a first set of parallel bars arranged parallel to the first axis and a second set of parallel bars arranged parallel to the second axis, wherein the second set of bars intersects the first set of bars thus forming a criss-cross configuration. Such a criss-cross configuration results in the light and shadow pattern cast on the photodetectors being in a form of a criss-cross pattern consisting of a first set of shadows in a form of bars parallel to the first axis, and a second set of shadows in a form of bars parallel to the second axis.

Such a criss-cross configuration of the encoding means provides the simplest way of forming the light and shadow pattern on the photodetectors, such that the photodetector pairs along both the first and second axes receive light and shadow in a complementary manner at a regular interval when the pattern moves with respect to the photodetectors.

The width of the first and second set of parallel bars forming the encoding means are preferably the same, and the parallel bars are spaced apart evenly at a distance equal to the width of the parallel bars. In this way, a uniform criss-cross configuration is formed, resulting in an easier way of arranging the photodetector pairs to receive light and shadow in a complementary manner at the regular interval.

The encoding means is preferably provided in a form of a plate, which is essentially flat. A flat encoding means, or an encoding plate used in the further preferred embodiment has the advantage of reducing the size of the optical position sensing device since the thickness of the encoding means is reduced by using a plate. A further advantage is that the pattern cast on the photodetectors using an encoding plate does not get distorted in any event that the light is emitted by the optical emitter that is arranged directly above the encoding means, and the emitted light does not impinge onto the photodetector in a perpendicular manner.

It should be noted that the encoding means may take on the form of other shapes in other embodiments. For example, a ball comprising the criss-cross configurations on its surface which allows a pattern of light and shadow to be cast on the photodetectors may be used instead. Also, the pattern of light and shadow may be provided using a transparent plate, with relevant portions on the transparent plate covered with an opaque material so that the light pattern is formed by light passing through the transparent plate, and the shadow pattern formed by light prevented from passing through by the opaque material.

The movement of the light and shadow pattern with respect to the photodetectors is preferably provided by the movement of the encoding plate, wherein the encoding plate is connected, directly or indirectly, to a device of which movement is to be detected. The photodetectors are preferably stationary, as the photodetectors are usually mounted on a substrate which contains other circuitries, making any movement of the photodetectors difficult.

According to the further preferred embodiment of the invention, the first axis and the second axis are perpendicular to each other. This thus results in the photodetectors being arranged perpendicularly to one another, and the first and second set of bars of the criss-cross pattern intersect one another in a perpendicular manner. In detecting a two-dimensional movement, for example the trackball of a mouse, the displacement is usually represented in the X-Y plane, and the X-axis and the Y-axis are perpendicular to each other. By having the photodetectors arranged in the same perpendicular manner, the calculations involved in relating the displacement information of the pattern to the actual displacement of the equipment which the sensing device is to determine are minimized. However, it should be noted that in other embodiments, the first axis and the second axis may not be restricted being perpendicular, but may be arranged at any other angles different from 0° with respect to each other.

The photodetectors used in the preferred embodiment are elongated photodiode strips, with the elongated axes arranged substantially parallel to the first and second axes, respectively. Such photodiode strips are commonly used in a quadrature output encoder. The photodiode strips are in a form of elongated shape so that a larger amount of light is received by the photodiode strips, and a higher photocurrent as compared to their complementary pairs is generated. The greater difference in photocurrent level within a photodetector pair provides a more reliable digital signal output as will be described later.

For this reason, it is preferable that the length of the photodetectors along the respective elongated axes be at least two times the width of the set of parallel bars forming the encoding means. To achieve a minimal modulation of light received by the first and second sensor when the encoding means moves in the direction parallel to the first and second axis, respectively, the length of the photodetectors along the respective elongated axes may be larger than the width of the set of parallel bars in an even number of times.

The first and second photodiode pairs are arranged in such a way that their elongated axes are substantially parallel to the first axis. They are also arranged adjacent to one another in an alternating order. Similarly, the third and fourth photodiode, pairs are arranged with their longitudinal axes parallel to the second axis, and are also arranged adjacent to one another in an alternating order. The photodiodes are arranged together so that they foam an Lshape. The width of the photodetectors, which is measured perpendicularly with respect to the elongated axes of the photodetectors, is preferably half the width of the parallel set of bars forming the encoding means. Such arrangement optimises circuitry space as the photodiodes can be placed at a corner of the substrate, allowing more space for other circuitries.

It should also be noted that the width of the photodetectors may be designed to be other values, for example one time or two times the width of the parallel set of bars forming the encoding means.

The output of the photodiodes parallel to the first axis can be processed in a first signal processing unit to generate a pair of quadrature output signals, that is the two output signals are 90° out of phase with each other. The quadrature signals are further processed in a first direction discriminating unit to extract the direction of movement parallel to the first axis. A series of pulses are also generated by the first direction discriminating unit from the quadrature signals, which provide information on the magnitude of the displacement in the direction parallel to the first axis. The output pulses and the direction information are fed into a first counting unit to generate the displacement information in the direction parallel to the first axis in signed binary.

Similarly, the output of the third pair and fourth pair of photodiodes along the second axis can be processed into third and fourth digital signals, respectively, by a second signal processing unit, such that the first and second digital signals are in quadrature with each other. The quadrature signals are further processed in a second direction discriminating unit to extract the direction of movement parallel to the second axis. A series of pulses are also generated by the second direction discriminating unit, which provide information on the magnitude of displacement in a direction parallel to the second axis. The output pulses and the direction information are fed into a second counting unit to generate the displacement information in the direction parallel to the second axis in signed binary. The output pulses and the direction information are fed into a second counting unit to generate the displacement information in the direction parallel to the second axis in signed binary.

The displacement information in both the directions parallel to the first axis and the second axis provides unambiguous information of the displacement from an initial point on a two-dimensional plane, and thus the new position on the two-dimensional plane can be determined.

The displacement information is represented in signed binary, and can be represented with as many bits as required by a user, setting the number of digital output levels in both the first and second axes. The resolution of the sensing device is determined by the size of the photodiodes, and it determines the sensitivity of the sensor, and a high resolution corresponds to a high sensitivity of the sensor. A sensing device with a high sensitivity means that a pulse is generated with a smaller movement. For example, a 150LPI encoder would generate a pulse for every 170 µm of movement. The sensitivity can be reduced by dividing the pulses generated by the discriminating units to a required ratio so that a pulse is generated with a larger movement, as a movement of 170 µm may be too sensitive for a human hand on a device, for example a computer mouse. Therefore, the sensing device according to the invention provides the user the flexibility of customizing the number of output levels, and also setting the sensitivity of the sensor to a suitable level.

The above and other features and advantages of the invention will become apparent from the following description and the appended claims, taken in conjunction with the accompanying drawings in which like parts or elements are denoted by like reference numbers.

The digital optical position sensing device according to the preferred embodiment of the invention comprises of two pairs of photodetectors arranged parallel to a first axis, and two other pairs of photodetectors arranged parallel to a second axis, wherein the first and second axes are at an angle with respect to each other. An encoding means is provided that interferes with a path of light incident on the photodetectors such that a pattern of light and shadow is cast onto the photodetectors.

The encoding means and the four pairs of photodetectors are arranged such that the total amount of light received by each-pair of photodetectors is unchanged, and when the light received by one photo-detector of a photodetector pair increases due to the movement of the encoding means, the light received by the other photodetector of the same photodetector pair decreases in a complementary manner.

It should be noted at this point that the optical position sensing device according to the invention may be constructed in a manner similar to the optical encoder 100 as described in FIG. 1A, with the optical detector 102 as the photodetectors, and the codewheel 103 as the encoding means. In this case, light is emitted by the optical emitter 101 onto the photodetectors, and the encoding means is positioned between the optical emitter 101 and the photodetectors such that it interferes with the path of the light emitted by the optical emitter 101, resulting in a pattern of light and shadow being cast onto the photodetectors.

Figure 1B:
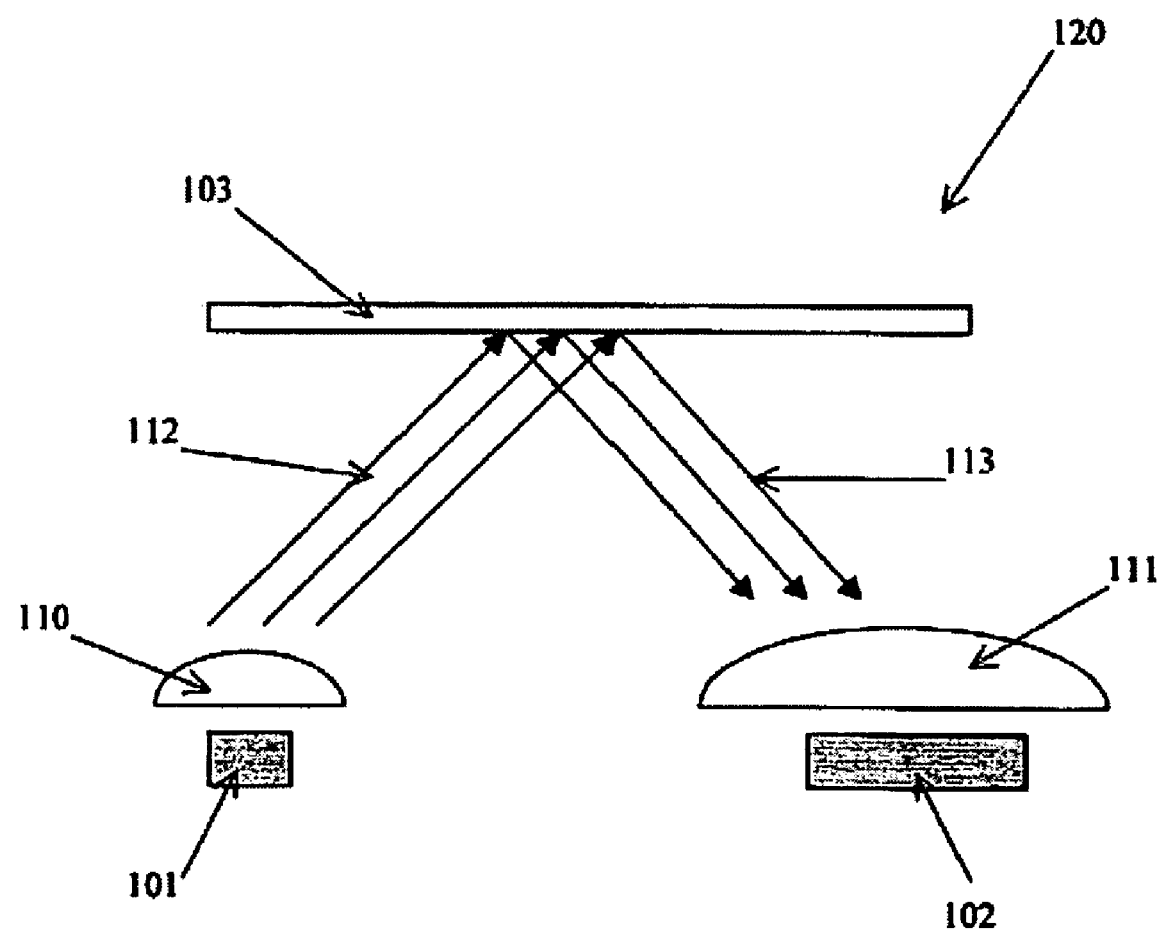
FIG. 1B shows a cross-section of a reflection optical encoder.

Similarly it is also possible that the optical position sensing device according to the invention be constructed in a manner similar to the encoder 120 as described in FIG. 1B. In this case, the light emitted by the optical emitter 101 is reflected by the encoding means, which replaces the codewheel 103, resulting in the reflected light to being cast in a pattern of light and shadow onto the photodetectors.

FIG. 2 shows a plan view of the photodetectors 205 and part of a light and shadow pattern which is cast on the photodetectors 205 according to the preferred embodiment of the invention.

The photodetectors 205 according to a further preferred embodiment of the invention is an array of elongated photodiode strips. Four photodiodes 210, 211, 212, 213 are, with their elongated axes, also known as the longitudinal axes, arranged parallel to the first axis, and another four photodiodes 214, 215, 216, 217 are, with their longitudinal axes, arranged parallel to the second axis. The four photodiodes 210, 211, 212, 213 parallel to the first axis are grouped into two pairs, with a first pair formed by the first photodiode 210 and the third photodiode 212, and a second pair formed by the second photodiode 211 and the fourth photodiode 213. Similarly, the four photodiodes 214, 215, 216, 217 parallel to the second axis are grouped into another two pairs, with the third pair formed by the fifth photodiode 214 and the seventh photodiode 216, and the fourth pair formed by the sixth photodiode 215 and the eighth photodiode 217. The photodiodes of the first and second photodiode pairs 210 to 213 parallel to first axis are arranged adjacent to one another in an alternating order, and the photodiodes of the third and fourth photodiode pairs 214 to 217 parallel to the second axis are also arranged adjacent to one another in an alternating order.

The first and second axes are chosen to be perpendicular to each other, and the photodiodes 214 to 217 parallel to the second axis are arranged against the photodiodes 210 to 213, such that the photodiodes 210 to 217 form an L-shape. This arrangement allows the photodetectors 205 to be placed at a corner of the substrate to maximise space for other IC circuitries.

The encoding means has a criss-crossed configuration formed by a first set of bars which are parallel to the first axis, and a second set of bars which are parallel to the second axis, intersecting the first set of bars. When the invention is implemented in an arrangement similar to encoder 100 described in FIG. 1A, light incidental on the first and second set of parallel bars of the encoding means is prevented from passing through, and light incidental on free areas between the parallel bars is able to pass through the encoding means onto the photodetectors 205. Therefore a pattern of light and shadow is cast on the photodiodes 210 to 217, wherein the light is cast as a result of light passing through the free areas of the encoding means and the shadow is cast as a result of light being prevented from passing through the encoding means by the first and second set of parallel bars. When the invention is implemented in an arrangement similar to encoder 120 described in FIG. 1B, the first and second set of bars on the encoding means are coated with a material which absorbs light incident on it, and the free areas are coated with a reflective material which reflects light incident on it. As a result, the reflected light from the encoding means casts a pattern of light and shadow, wherein the light is cast as a result of light being reflected at the free areas of the encoding means and shadow is cast as a result of light being absorbed at the first and second set of bars of the encoding means.

The encoding means in the further preferred embodiment of the invention is provided by a plate. The plate, or encoding plate as it shall be called henceforth, has the advantage of casting a uniform pattern of light and shadow as the light incident or passing through it does not get distorted.

The light and shadow pattern cast from the encoding plate on the photodiodes 210-217 is a criss-crossed pattern 204 formed by a first set of lines or bars 201 parallel to the first axis and a second set of lines or bars 202 parallel to the second axis. The first and second sets of bars 201, 202 correspond to the shadow cast by the set of bars from the encoding plate. Free areas 203 enclosed by the first and second sets of shadow bars 201, 202 correspond to the light that passes through or is reflected by the free areas of the encoding plate.

The width of each of the photodiode strips used in this preferred embodiment is half the width of the set of bars 201, 202 belonging to the light and shadow pattern 204. In other words, when four photodiode strips belonging to the first and second photodiode pairs 210 to 213 are arranged adjacent to one another, the first and second photodiodes 210, 211 are in the shadow, and the third and fourth photodiodes 212, 213 are in the light. The length of each photodiode strip is arranged so that it receives an amount of light which corresponds to four open areas 203. This ensures that it receives enough light to generate a photocurrent which is sufficiently high compared to the photocurrent generated by the complementary photodiode in the shadow.

The pattern of light and shadow 204 is cast such that at any one time, the amount of light received by a pair of photodiodes is constant. When the light received by one photodiode of the pair of photodiodes increases; the light received by the other photodiode of the same photodiode pair decreases in a complementary manner. Therefore, the pair of photodiodes is said to be illuminated in a complementary manner. To indicate this complementary functionality, the first pair of photodiodes 210, 212 and the second pair of photodiodes 211, 213 parallel to the first axis are denoted by symbols A, A, B and B, respectively. In the same manner, the third pair of photodiodes 214, 216 and the fourth pair of photodiodes 215, 217 parallel to the second axis are denoted by symbols C, C, D, D, respectively to indicate their complementary functionality.

Figure 2A:
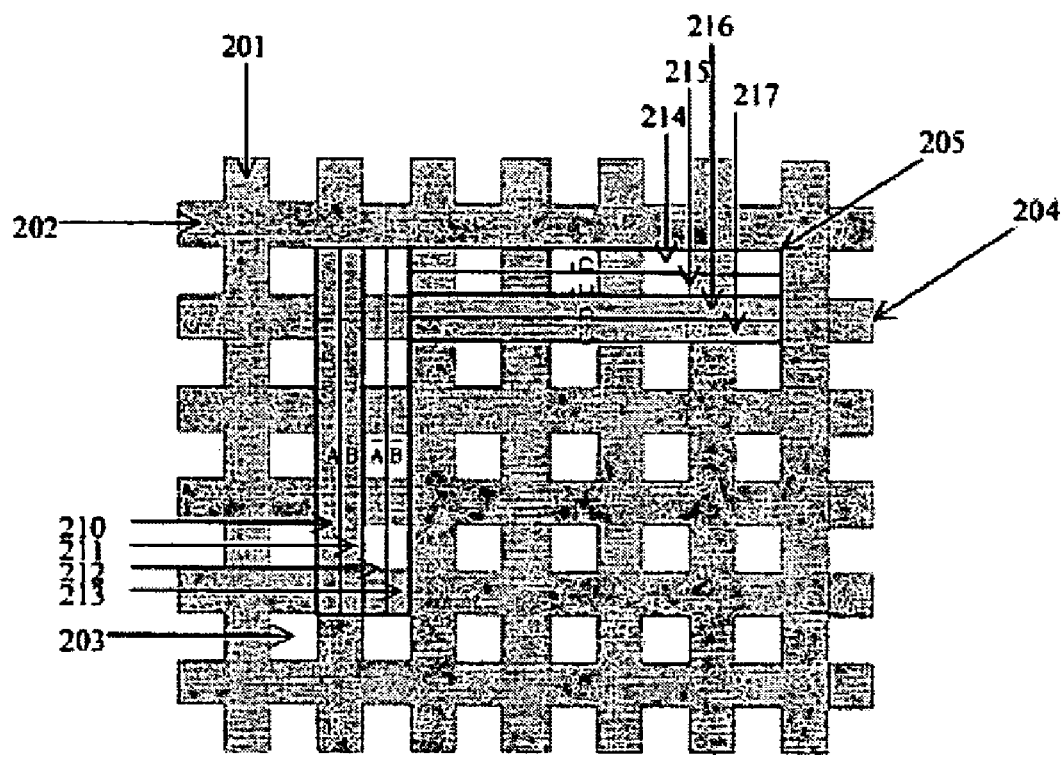
FIG. 2A shows a plan view of the optical detector and part of the pattern of the encoding plate that is cast on the optical detector according to the invention.
Figure 2B:
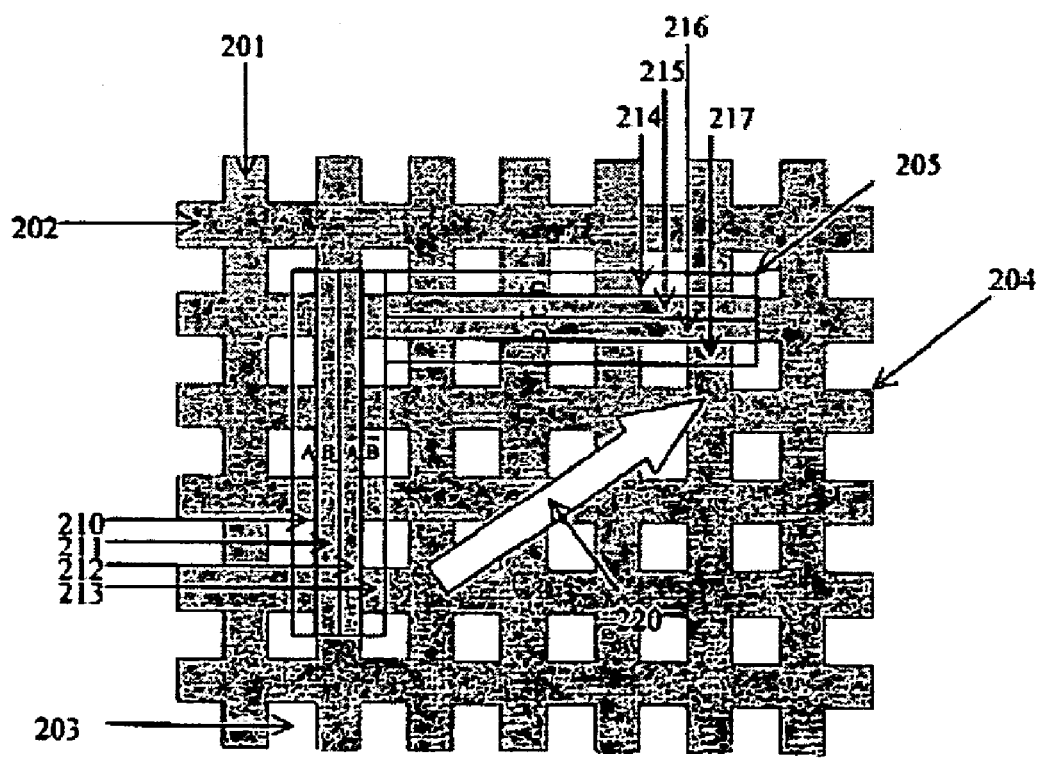
FIGS. 2B to 2D show the sequence of the pattern of light and shadow that is cast on the optical detector when the encoding plate moves towards the top and the right directions according to the invention.

In FIG. 2A, shadow is cast on photodiodes 210, 211, 214, 215 and light is cast on the respective complementary photodiodes 212, 213, 216, 217. The movement of the encoding plate causes a corresponding movement of the light and shadow pattern 204 on the photodiodes 210 to 217. When the encoding plate moves upwards and towards the right in the direction indicated by the arrow 220 in FIG. 2B, photodiode 210 receives an increase in amount of light, and photodiode 212 receives a decrease in amount of light correspondingly. When the encoding plate moves to the position as indicated in FIG. 2B, light is now cast on photodiodes 210, 213, 214, 217, and shadow is cast on the respective complementary photodiodes 211, 212, 215, 216. It should be noted that photodiodes 210 and 214 that were previously in the shadow are now in the light, and the complementary photodiodes 212 and 216 that were previously in the light are now in the shadow. Therefore, when light is cast onto one photodiode, shadow is always cast on the other complementary photodiode of the same pair.

Figure 2C:
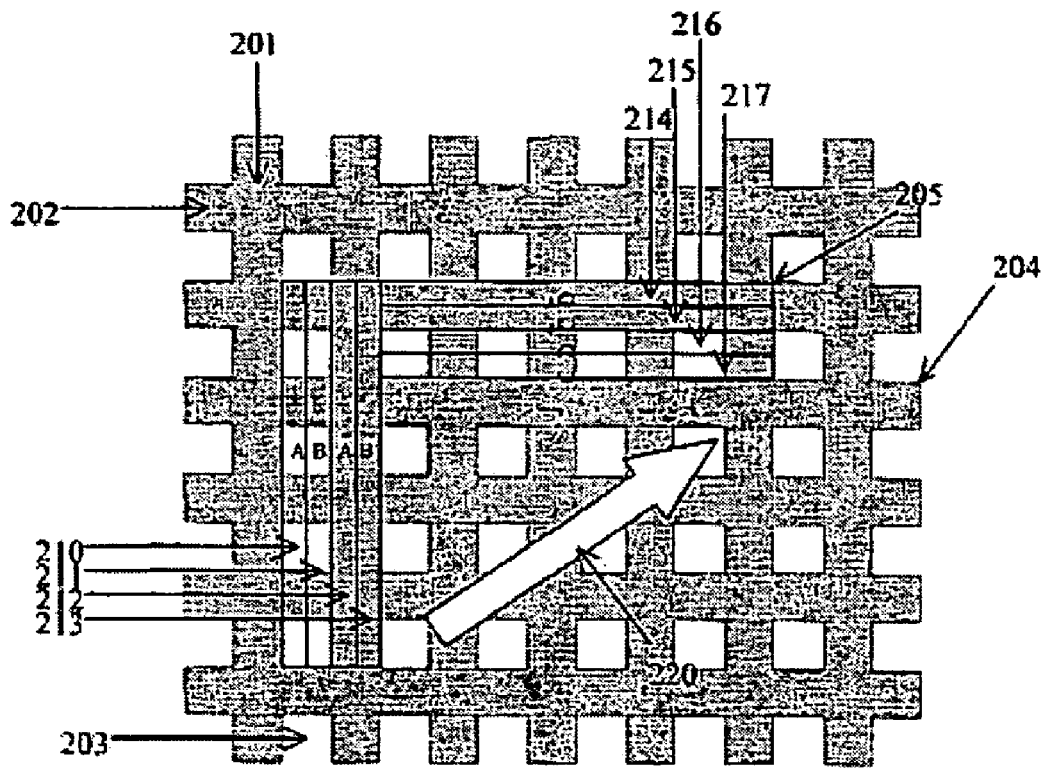
Figure 2D:
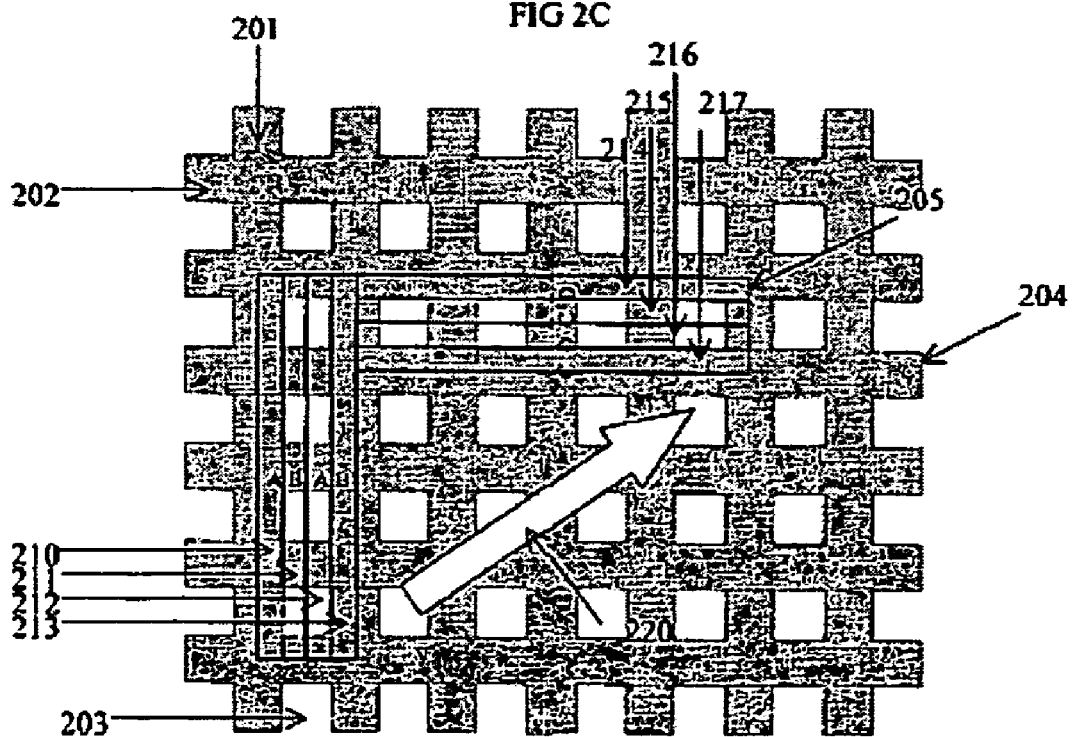

FIG. 2C and FIG. 2D show the light and shadow pattern on the photodiodes 210 to 217 when the light and shadow pattern continues to move in the direction of the arrow 220. When the light and shadow pattern continues to move in the same direction 220 from the position shown in FIG. 2D, the light and shadow pattern 204 on the photodiodes 210 to 217 will be the same as the pattern as shown in FIG. 2A. In other words, a cycle is said to being completed and a new cycle will begin if the light and shadow pattern continues to move in the same direction 220. Taking the pattern on the photodiodes 210 to 217 in FIG. 2A as the initial position, the movement of the light and shadow pattern from the initial position to the position as shown in FIG. 2B corresponds to a quarter of a cycle or 90 electrical degrees. Similarly, the movement of the light and shadow pattern from the initial position in FIG. 2A to the position as shown in FIG. 2C and FIG. 2D corresponds to 180 and 270 electrical degrees, respectively.

A photodiode produces a photocurrent which is proportional to the amount of light incident on it. When a light is cast on the photodiode, a high photocurrent is generated. Conversely, when a shadow is cast on the photodiode, a low photocurrent is generated. The photocurrents generated by the photodiode pairs 210 to 217 are captured and processed, generating into a Transistor-Transistor Logic (TTL) compatible digital signal for each pair of photodiodes.

Figure 3:
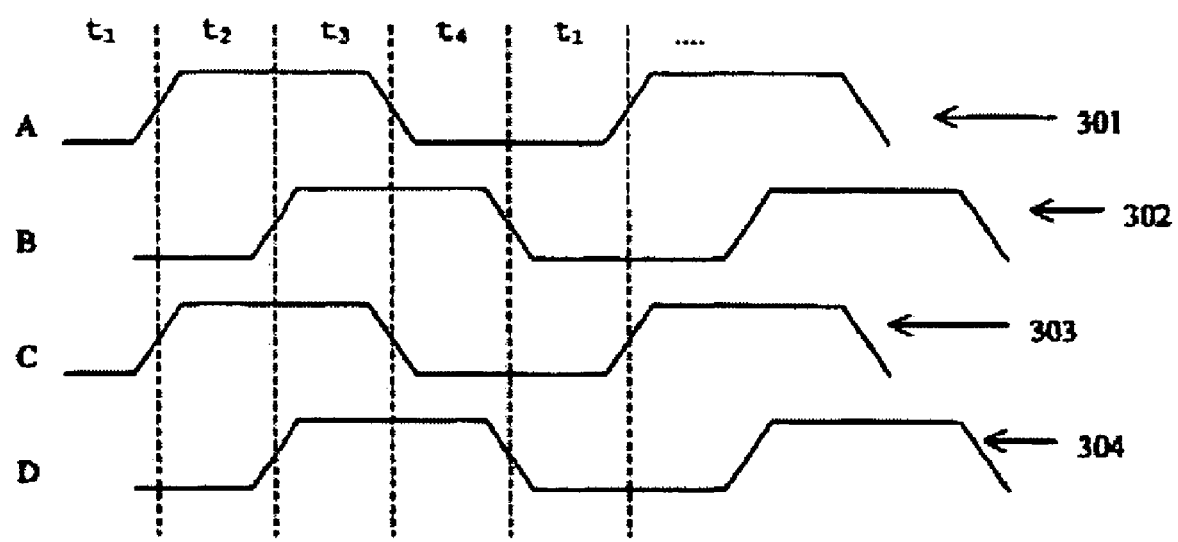
FIG. 3 shows the quadrature output of the pairs of photodiodes as a result of the movement of the plate according to the invention.

FIG. 3 shows the digital signals corresponding to the photodiode pairs. A first digital signal 301 corresponds to the first photodiode pair 210, 212 and a second digital signal 302 corresponds to the second photodiode pair 211, 213 parallel to the first axis. A third digital signal 303 corresponds to the third photodiode pair 215, 217 and a fourth digital signal 304 corresponds to the fourth photodiode pair 214, 216 parallel to the second axis. The initial position at 0 electrical degrees as shown in FIG. 2A and the positions at 90, 180° and 270 electrical degrees as shown in FIG. 2B, FIG. 2C and FIG. 2D are represented by the status $t_1$, $t_2$, $t_3$ and $t_4$, respectively.

The status t1, $t_2$, $t_3$ and $t_4$ altogether define one complete cycle, representing 360 electrical degrees. The digital signals 301 to 304 are either at a 'high' or a 'low' state, and the signals 301 to 304 stay at each state for a duration of 180 electrical degrees.

Before the initial position of $t_1$, all the digital signals 210 to 213 are set to the 'low' state. At $t_1$ the photodiode 210 of the first pair along the first axis is in the shadow, whereas the other photodiode 212 of the same pair is in the light, and therefore a low photocurrent level is generated from photodiode 210 and a high photocurrent is generated from photodiode 212. At $t_2$, light is cast on the photodiode 210 and shadow is cast on the other photodiode 212 of the same pair, resulting in a transition from low to high photocurrent level in photodiode 210 and a transition from high to low photocurrent level in photodiode 212 at the same time. Such simultaneous change of photocurrent levels in both the photodiodes 210, 212 of the same pair causes a toggle in the first digital signal 301 corresponding to the first photodiode pair. Therefore, the first digital signal 301 is toggled to the 'high' state at $t_2$. At $t_3$, the photodiode 210 is in the light and the other photodiode 212 of the same pair is in the shadow, which are the same states as in $t_2$. Therefore, there is no change in the corresponding photocurrent levels, and the first digital signal 301 remains at the 'high' state. At $t_4$, shadow is cast on the photodiode 210 and light is cast on the photodiode 212, resulting again in a change in both the corresponding photocurrents. As a result, the first digital signal 301 is toggled from the 'high' state to the 'low' state at $t_4$.

At both $t_1$ and $t_2$, the photodiode 211 of the second pair parallel to the first axis is in the shadow, and the other photodiode 213 belonging to the same pair is in the light. Therefore, there is no change in the second digital signal 302 that corresponds to the second photodiode pair 211, 213. At $t_3$, light is cast on photodiode 211 and shadow is cast on photodiode 213, resulting in a change in the photocurrent level of the second photodiode pair 211, 213. This causes the second digital signal 302 to toggle from the 'low' state to the 'high' state. The second digital signal 302 remains at the 'high' state for 180 electrical degrees until at $t_1$, when the photocurrent level of the photodiode pair 211, 213 changes, resulting in the second digital signal 302 being toggled back to the 'low' state.

The third and fourth digital signals 303, 304 change with the photocurrent level of the third photodiode pair 215, 217 and the fourth photodiode pair 214, 216 along the second axis in the same manner as described above.

It can be seen that the digital signals 301 to 304 comprise a series of pulses generated by the changes in photocurrent levels of the corresponding photodiode pairs.

The digital signals 301 corresponding to the first photodiode pair 210, 212 and the second digital signal 302 corresponding to the second photodiode pair 211, 213 are in quadrature. In other words, the two digital signals 3.01, 302 are 90 electrical degrees out of phase with each other. In this case, the first digital signal 301 lags the second digital signal 302 by a phase of 90 electrical degrees. This phase shift between the two digital signals 301, 302 provides the information for the direction of movement of the encoding plate parallel to the first axis. When the encoding plate moves in the opposite direction parallel to the first axis, the corresponding phase shift between the digital signals 301, 302 will be in the opposing direction, i.e. the second digital, signal 302 will lag the first digital signal 301 by 90 electrical degrees. In the same way, the third digital signal 303 corresponding to the third photodiode pair 215, 217 and the fourth digital signal 304 corresponding to the fourth photodiode pair 214, 216 are in quadrature. In this case, the third digital signal 303 lags the fourth digital signal 304 by a phase of 90 electrical degrees. This phase shift between the two digital signals 303, 304 provides the information for the direction of movement of the encoding plate parallel to the second axis. When the encoding plate moves in the opposite direction parallel to the second axis, the corresponding phase shift between the digital signals 303, 304 will be in the opposing direction.

Figure 4:
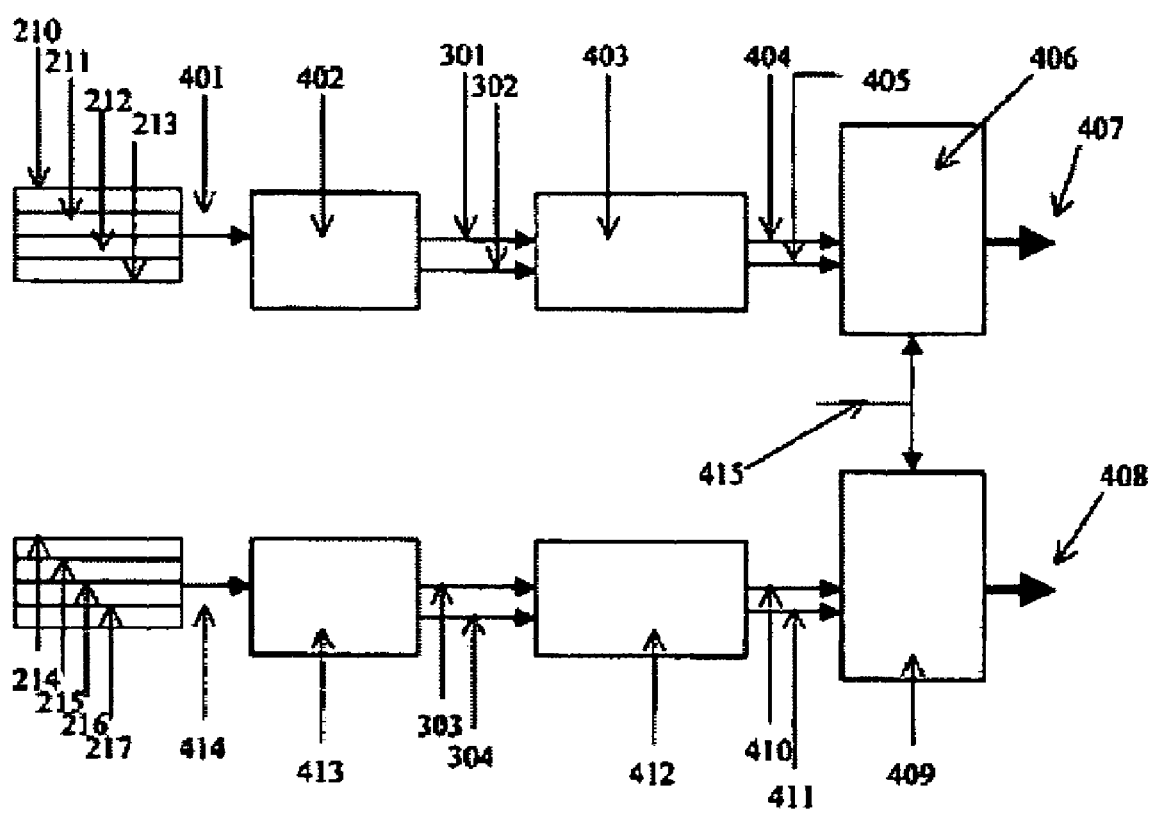
FIG. 4 shows the arrangement for processing and obtaining information on the displacement along the first and second axis according to the invention.

FIG. 4 shows an arrangement for processing and obtaining displacement information from the photodiodes according to the invention.

The photocurrents 401 from the first and second photodiode pairs 210 to 213 are processed in a first signal processing unit 402. The first signal processing unit 402 detects the variations of the photocurrent levels 401 from each of the photodiodes 210 to 213 and outputs the pair of quadrature signals 301, 302 corresponding to the first and second photodiode pairs 210 to 213 arranged parallel to the first axis. A first direction discriminating unit 403 detects the phase difference between the pair of quadrature signals 301, 302 and produces a direction output signal 405 which is indicative of the direction of movement of the light pattern. A pulse output 404 is also generated by the first direction discriminating unit 403 which is proportional to the number of cycles of the quadrature signal 301, 302. The pulse output 404 provides information on the magnitude of the displacement of the light pattern parallel to the first axis.

A first counting unit 406 counts the number of pulses from the pulse output 404 from the first direction discriminating unit 403 and determines the magnitude of displacement of the light pattern. The direction output signal 405 is also provided to the first counting unit 406, so that the displacement of the light pattern along the first axis can he determined, and is represented in signed binary 407.

In a similar way, the photocurrents 414 from the third and fourth photodiode pairs 214 to 217 are processed in a second signal processing unit 413. The second signal processing unit 413 detects the variations of the photocurrent levels 414 from each of the photodiodes 214 to 217 and outputs a pair of quadrature signals 303, 304 corresponding to the third and fourth photodiode pairs 214 to 217 arranged parallel to the second axis. A second direction discriminating unit 412 detects the phase difference of the pair of quadrature signals 303, 304 and produces a direction output signal 411 which is indicative of the direction of movement of the light pattern. A pulse output 410 is also generated by the second direction discriminating unit 412 which is proportional to the number of cycles of the quadrature signals 303, 304. The pulse output 410 provides information on the magnitude of the displacement of the light pattern parallel to the second axis.

A second counting unit 409 counts the number of pulses from the pulse output 410 from the second direction discriminating unit 412 and determines the magnitude of displacement of the light pattern. The direction output signal 411 is also provided to the second counting unit 409, so that the displacement of the light pattern along the second axis can be determined, and is represented in signed binary 408.

A reset signal 415 is provided for both the first counting unit 406 and the second counting unit 409 to cause the counting of the output pulses 404, 410 to start from the beginning, i.e. the displacement along both the first and second axes are reset to zero. The reset signal 415 can be used when a new displacement from a new initial position is to be determined.

The displacement parallel to the first axis represented by the signed binary 407 from the first counting unit 406 and the displacement parallel to the second axis represented by the signed binary 408 from the second counting unit 409 provides the two-dimensional displacement information of the light pattern, which is directly proportional to the displacement of the encoding plate. The displacement of an actual device which the encoding plate is connected to, directly or indirectly, can thus be determined.

The preferred embodiment described above comprises of two photodiode pairs arranged parallel to the first axis and another two photodiode pairs arranged parallel to the second axis. In an alternative embodiment, the photodiode pairs may be expanded by interdigitating several cycles of the photodiode pairs parallel to each axis. In other words, a further fifth and sixth photodiode pairs can be arranged parallel to the first axis, resulting in four pairs of photodiodes. The first pair and the fifth photodiode pairs will receive the same light and shadow pattern, and similarly, the second pair and sixth photodiode pairs will receive the same light and shadow pattern. Therefore, the quadrature signals produced by the fifth and sixth photodiode pairs will be identical to the quadrature signals produced by the first and second photodiode pairs. If a photodiode or a part of the encoding plate is damaged, the quadrature signals of the corresponding photodiode pair can be used to compensate for the displacement information. Hence the arrangement according to this alternative embodiment increases the robustness of the sensing device. Similarly, a seventh and eighth photodiode pairs can also be arranged parallel to the second axis, resulting in four photodiode pairs parallel to the second axis for the same reason.

However, the space required for the optical position sensing device in this alternative embodiment is increased, due to at least twice the number of photodiodes required.

While certain embodiments of the invention have been described, they are merely illustrative of the principles of the invention. Other embodiments and configurations may be devised without departing from the spirit of the invention and the scope of the appended claims.

What is claimed:

1. An optical position sensing device for sensing a two-dimensional displacement, comprising:
    a first photosensor including a plurality of photodetectors arranged parallel to a first axis, the plurality of photodetectors including at least a first pair and a second pair of photodetectors, wherein the photodetectors of the first and second pairs are arranged adjacent to and in an alternating manner with each other;
    a second photosensor including a plurality of photodetectors arranged parallel to a second axis, the plurality of photodetectors including at least a third pair and a fourth pair of photodetectors, wherein the photodetectors of the third and fourth pairs are arranged adjacent to and in an alternating manner with each other, and the first and the second axes are at an angle with respect to each other; and
    an encoder positioned to interfere with a path of light incident on the photosensors such that a pattern of light and shadow is cast onto the photosensors,
    wherein the encoder and the photosensors are able to move with respect to each other, resulting in modulation of light received by the photosensors, and are arranged such that when the encoder moves relatively in a direction parallel to the first axis, the modulation of light received by the second photosensor is larger than the modulation of light received by the first photosensor, and when the encoder moves relatively in a direction parallel to the second axis, the modulation of light received by the first photosensor is larger than the modulation of light received by the second photosensor.

2. The optical position sensing device of claim 1, wherein the encoder and the photodetector pairs are arranged such that the total amount of light received by each pair of photodetectors is substantially unchanged, and when the light received by one photodetector of one photodetector pair increases due to the movement of the encoder, the light received by the other photodetector of the same photodetector pair decreases in a complementary manner.

3. The optical position sensing device of claim 1, wherein the first and second pairs of photo detectors form an L-shape with the third and fourth pairs of photodetectors.

4. The optical position sensing device of claim 1, wherein the encoder includes a first set of parallel bars arranged parallel to the first axis and a second set of parallel bars arranged parallel to the second axis, and the second set of bars intersects the first set of bars to form a crisscross configuration.

5. The optical position sensing device of claim 4, wherein the parallel bars of the first set each have a same width and are spaced apart evenly at a distance equal to the width from one another, and the parallel bars of the second set each have a same width and are spaced apart evenly at a distance equal to the width from one another.

6. The optical position sensing device of claim 5, wherein the respective widths of the parallel bars of the first set are the same as the respective widths of the parallel bars of the second set.

7. The optical position sensing device of claim 1, wherein the encoder is provided in a form of a plate.

8. The optical position sensing device of claim 1, wherein the first axis and the second axis are perpendicular to each other.

9. The optical position sensing device of claim 8, wherein the photodetectors are arranged such that they form an L-shape.

10. The optical position sensing device of claim 1, wherein each of the photodetectors includes an elongated photodiode strip.

11. The optical position sensing device of claim 10, wherein an elongated axis of each of the photodetectors is arranged substantially parallel to the first or second axis.

12. The optical position sensing device of claim 11, wherein a length along the elongated axis of each of the photodetectors is at least two times the width of the parallel bars of the encoder.

13. The optical position sensing device of claim 12, wherein the length along the elongated axis of each of the photodetectors is larger than the width of the parallel bars by an even number of times.

14. The optical position sensing device of claim 11, wherein a width perpendicular to the elongated axis of each of the photodetectors is less than two times the width of the parallel bars of the encoder.

15. The optical position sensing device of claim 14, wherein the width of each of the photodetectors is less than the width of the parallel bars.

16. The optical position sensing device of claim 14, wherein the width of each of the photodetectors is half the width of the parallel bars.

17. An optical position sensing device for sensing a two-dimensional displacement, comprising:
    a first photosensor including a first pair of photodetectors arranged parallel to a first axis;
    a second photosensor including a second pair of photodetectors arranged parallel to a second axis, wherein the first and the second axes are at an angle with respect to each other; and
    an encoder positioned to interfere with a path of light incident on the photosensors such that a pattern of light and shadow is cast onto the photo sensors,
    wherein the encoder and the photosensors are able to move with respect to each other, resulting in modulation of light received by the photosensors, and are arranged such that when the encoder moves relatively in a direction parallel to the first axis, the modulation of light received by the second photosensor is larger than the modulation of light received by the first photosensor, and when the encoder moves relatively in a direction parallel to the second axis, the modulation of light received by the first photosensor is larger than the modulation of light received by the second photosensor, and
    wherein the encoder and the first and second pairs of photodetectors are arranged such that the total amount of light received by each photodetector pair is substantially unchanged, and when the light received by one photodetector of one pair increases due to the movement of the encoder, the light received by the other photodetector of the same pair decreases in a complementary manner.

18. The optical position sensing device of claim 17, wherein the first photo sensor includes an additional pair of photodetectors arranged parallel to the first axis, and the second photosensor includes an additional pair of photodetectors arranged parallel to the second axis.

19. The optical position sensing device of claim 18, wherein the photodetectors of the first pair and additional pair of the first photosensor are arranged adjacent to and in an alternating manner with each other, and the photodetectors of the second pair and additional pair of the second photosensor are arranged adjacent to and in an alternating manner with each other.

20. The optical position sensing device of claim 17, wherein the encoder includes a first set of parallel bars arranged parallel to the first axis and a second set of parallel bars arranged parallel to the second axis, and the second set of bars intersects the first set of bars to form a criss-cross configuration.

\* \* \* \* \*

UNITED STATES PATENT AND TRADEMARK OFFICE
CERTIFICATE OF CORRECTION

PATENT NO. : 7,238,932 B2 Page 1 of 1
APPLICATION NO. : 11/436337
DATED : July 3, 2007
INVENTOR(S) : Chong-Hin Chee It is certified that error appears in the above-identified patent and that said Letters Patent is hereby corrected as shown below:

Col. 13 Line 56 In Claim 3, delete "photo detectors" and insert -- photodetectors --, therefor. (Consider Space)

Col. 14, Line 50 In Claim 17, delete "photo sensors," and insert -- photosensors, --, therefor. (Consider Space)

Col. 15 Line 5 In Claim 18, delete "photo sensor" and insert -- photosensor --, therefor. (Consider Space)

Signed and Sealed this

Sixteenth Day of December, 2008

JON W. DUDAS
*Director of the United States Patent and Trademark Office*